April 17, 1956   C. BRAMMING   2,742,170
CLOSURE FOR WIDE MOUTH CONTAINERS
Filed July 9, 1952
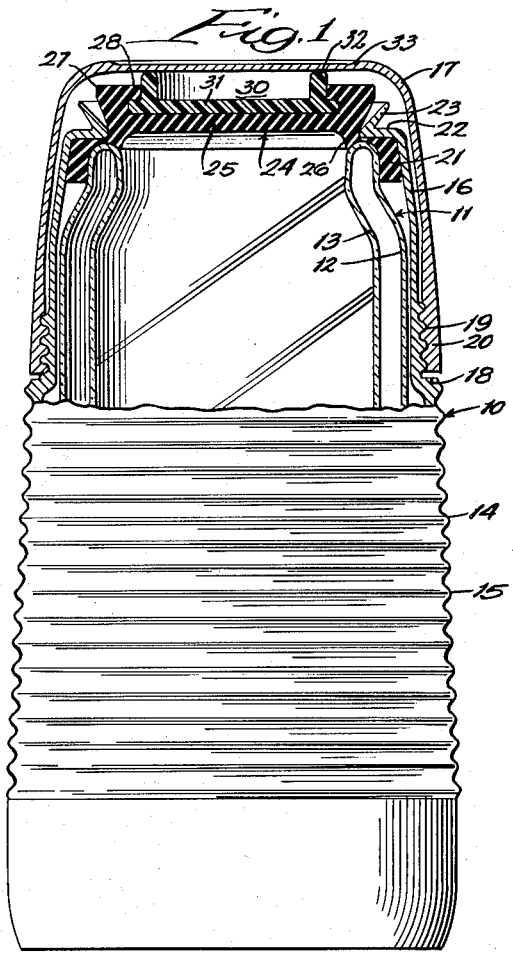
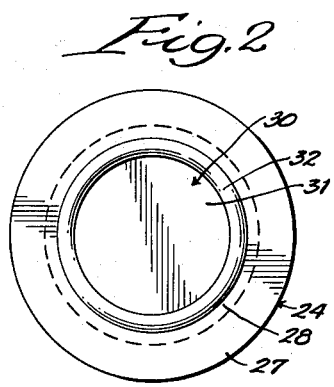
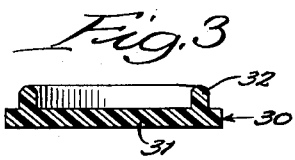
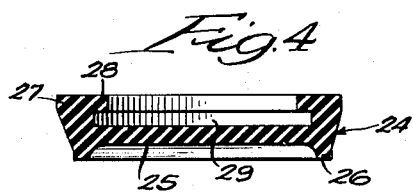
INVENTOR:
Carl Bramming,
BY
Dawson & Ooms,
ATTORNEYS.

United States Patent Office 2,742,170
Patented Apr. 17, 1956

2,742,170

CLOSURE FOR WIDE MOUTH CONTAINERS

Carl Bramming, Nashville, Tenn., assignor to Aladdin Industries, Incorporated, Nashville, Tenn., a corporation of Illinois Application July 9, 1952, Serial No. 297,891

1 Claim. (Cl. 215—13)

This invention relates to an improvement in vacuum bottles and more particularly to a new and improved closure assembly for effecting a sealing relation with glass fillers, particularly of the wide mouth type.

An object of this invention is to provide a new and improved closure assembly of the type described which is simple in construction, easy in operation and economically manufactured of a few simple parts capable of assembly in an expedient manner to form a removable closure.

Another object is to provide a closure of the type described formed of rubber or other resilient material for effecting the sealing relation with the mouth of the glass filler and which has an insert for imparting sufficient rigidity to the rubber sealing portion to prevent such deformation as would avoid the maintenance of a desired sealing relation.

These and other objects and advantages of this invention will hereinafter appear, and for purposes of illustration, but not of limitation, an embodiment of the invention is shown in the accompanying drawing in which—

Figure 1 is an elevational view partially in section of a vacuum bottle embodying features of this invention;

Figure 2 is a top plan view of the closure assembly used for effecting the sealing relation in the vacuum bottle of Figure 1;

Figure 3 is a sectional view of the rigid insert; and

Figure 4 is a sectional elevational view of the sealing member in which the element of Figure 3 is inserted to form the closure assembly.

While description of the closure assembly will be made in connection with a wide mouth vacuum bottle, it will be understood that the concepts herein may be embodied in a closure adapted for use in establishing a sealing relation with other containers having a screw cap or the like to assist in holding the assembly in position of use, as will hereinafter appear.

As shown in the drawing, the vacuum bottle 10 comprises a glass filler 11 having an outer blank 12 and an inner blank 13 joined in spaced apart relation but with the area therebetween exhausted to minimize heat transfer in either direction. The walls of the blank may be silvered or finished with other reflective surface further to minimize heat transfer.

The glass filler 11 is positioned within a casing 14 generally formed of sheet metal or plastic material having resilient rings for supporting and positioning the glass filler therein in spaced apart relation whereby impacts on the casing are absorbed prior to transmission to the glass filler, otherwise excessive breakage would occur. The body portion of the casing may be formed with rib 15 or other decorative design while the upper end portion 16 adapted to receive the cup member 17 is inset slightly all around from the body portion to provide a shoulder 18 therebetween. The lower end of the inset end portion is threaded, as at 19, for engagement with the threaded end 20 on the inside wall of the cup member 17 whereby the cup may be screwed onto the casing.

An annular gasket 21 formed of rubber or other resilient material is located between the upper end portion of the filler 11 and the casing 14 to seal the two members in a manner to prevent fluid or other substance from entering the space between the filler and casing. The end of the casing is turned inwardly to form an annular flange 22 which extends to the edge of the glass filler and then flares outwardly and upwardly to form a pouring lip 23 and to protect the upper end of the glass filler against breakage by impact or the like. The gasket is adapted to have an end portion extending between the lip and the upper edge of the filler to impart resiliency for absorption of impact.

The closure member embodying features of this invention comprises a gasket 24 of rubber or other resilient material having a disc portion 25 dimensioned to extend over and slightly beyond the mouth of the glass filler. An annular skirt 26 depends from the rim of the disc and is inclined outwardly to engage the upper edge of the glass filler in position of use. A ring portion 27 extending upwardly all around from the upper edge of the disc has an inwardly extending flange 28 in spaced apart relation with the upper surface of the disc 25 to form an annular groove 29 therebetween.

An insert 30 formed of metal, plastics, wood or other resilient material comprises a relatively flat disc 31 adapted to seat against the upper wall of the disc 25 of the gasket member 24 with the edge portion extending beyond an annular rib 32 being seated within the groove 29. The rib 32 is dimensioned to extend upwardly beyond the resilient gasket when in the assembled relation for operative engagement by the bottom wall 33 of the cup member 17 whereby the insert is actuated by the cup in the direction to urge the apron 26 into firm sealing relation with the edge of the glass filler 11, as shown in Figure 1, when the cup is turned down to the assembled relation on the casing.

It will be apparent from the description that the closure assembly is held in position of use by the cup member. Upon removal of the cup, the closure may be lifted from the mouth of the bottle to permit free access to the interior of the glass filler for filling or pouring.

The closure assembly formed of a rigid insert and a resilient gasket provides a rubber seal all around to effect the desired sealing relation with minimum material, yet embodies sufficient rigidity and stability to effect the desired sealing relation upon securing the cup to position of use. This simple construction eliminates the need for costly corks which are capable of deterioration and loss and permits removal or replacement of parts in an expedient and an inexpensive manner.

It will be understood that disc portion 25 may also be formed of rigid material with the depending skirt comprising rubber to effect the desired sealing relation with the container. It will be further understood that other changes may be made in the details of construction, arrangement and operation without departing from the spirit of the invention, especially as defined in the following claim.

In a vacuum bottle unit having a vacuum insulated receptacle with an annular lip defining a mouth therein, and a cap detachably receivable on said unit over said mouth, the improvement comprising a soft resilient rubber-like generally circular closure member of a diameter substantially greater than the inside of said mouth for spanning and covering said mouth, said closure member including a substantially flat circular disk-like body portion having an annular skirt depending from the rim thereof for abutting engagement with said lip on said vacuum insulated receptacle, said closure member including an annular flange extending upwardly from the rim of said body portion and having a radially inturned portion spaced above said body portion to define an annular retaining groove therebetween, a substantially rigid disk having a lower face engaging the top of said body portion, said disk having a rim portion received and disengageably retained in said annular groove, said disk having a rib extending upwardly thereon above the upper end of said rubber-like closure member for engaging the underside of said cap and receiving downward thrust therefrom to urge said skirt into sealing relation with said lip, said disk being substantially smaller in diameter than the inside of said mouth whereby the downward thrust exerted by said cap on said disk expands and pinches said skirt between said disk and said lip.

References Cited in the file of this patent

UNITED STATES PATENTS

| | | |
|---|---|---|
| 241,762 | Vom Hofe | May 17, 1881 |
| 746,496 | Grau | Dec. 8, 1903 |
| 1,716,622 | Cohen | June 11, 1929 |
| 1,960,247 | Kerr et al. | May 29, 1934 |
| 1,987,892 | Duevel | Jan. 15, 1935 |
| 2,228,056 | Kazanjian | Jan. 7, 1941 |
| 2,449,316 | Pfleumer | Sept. 14, 1948 |
| 2,610,755 | Gits | Sept. 16, 1952 |

FOREIGN PATENTS

| | | |
|---|---|---|
| 480,943 | Germany | Aug. 10, 1929 |
| 1,013,881 | France | May 7, 1952 |